United States Patent
Vesterinen et al.

(10) Patent No.: US 10,390,377 B2
(45) Date of Patent: Aug. 20, 2019

(54) LOCAL BREAKOUT IN SMALL CELL ARCHITECTURE

(71) Applicant: Nokia Solutions and Networks Oy, Espoo (FI)

(72) Inventors: Seppo Ilmari Vesterinen, Oulunsalo (FI); Esa Mikael Malkamaki, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 163 days.

(21) Appl. No.: 15/514,569

(22) PCT Filed: Sep. 29, 2014

(86) PCT No.: PCT/EP2014/070771
§ 371 (c)(1),
(2) Date: Mar. 27, 2017

(87) PCT Pub. No.: WO2016/050261
PCT Pub. Date: Apr. 7, 2016

(65) Prior Publication Data
US 2017/0231026 A1    Aug. 10, 2017

(51) Int. Cl.
*H04W 36/38* (2009.01)
*H04W 76/12* (2018.01)
(Continued)

(52) U.S. Cl.
CPC ....... *H04W 76/12* (2018.02); *H04W 36/0069* (2018.08); *H04W 76/15* (2018.02);
(Continued)

(58) Field of Classification Search
CPC ..... H04W 76/20; H04W 88/16; H04W 36/00; H04W 36/0069; H04W 72/048; H04W 76/15; H04W 92/20
See application file for complete search history.

(56) References Cited

U.S. PATENT DOCUMENTS

2012/0224536 A1* 9/2012 Hahn ............... H04L 45/00
370/328
2014/0241317 A1* 8/2014 Jamadagni .......... H04L 5/0032
370/331

FOREIGN PATENT DOCUMENTS

WO  WO 2015/020366 A1  2/2015
WO  WO 2015/021597 A1  2/2015

OTHER PUBLICATIONS

3GPP TS 23.401 V13.0.0 (Sep. 2014), "$3^{rd}$ Generation Partnership Project; Technical specification Group Services and Systems Aspects; General Packet Radio Service (GPRS) enhancements for Evolved Universal Terrestrial Radio Access Network (E-UTRAN) access (Release 13)", Sections, 4.3.2a, 4.3.15, 4.3.16, 7 pgs.

(Continued)

*Primary Examiner* — Mansour Oveissi
*Assistant Examiner* — David M Oveissi
(74) *Attorney, Agent, or Firm* — Harrington & Smith (57) ABSTRACT

A primary connection to a user terminal configured to operate using dual connectivity is maintained. A first control interface is maintained to a first radio node maintaining a secondary connection to the user terminal configured to operate using dual connectivity, the first radio node providing a local gateway for the user terminal. A second control interface is maintained to a core network and a local gateway towards a core network is emulated by providing control plane functions of the local gateway provided by the first radio node towards the core network over the second control interface. Local gateway related control messages are relayed between the core network and the first radio node over the first control interface.

18 Claims, 4 Drawing Sheets

(51) Int. Cl.
*H04W 76/15* (2018.01)
*H04W 36/00* (2009.01)
*H04W 8/08* (2009.01)
*H04W 16/32* (2009.01)
*H04W 88/16* (2009.01)
*H04W 92/04* (2009.01)

(52) U.S. Cl.
CPC ............ *H04W 8/082* (2013.01); *H04W 16/32* (2013.01); *H04W 88/16* (2013.01); *H04W 92/045* (2013.01)

(56) References Cited

OTHER PUBLICATIONS

3GPP TS 36.300 V12.2.0 (Jun. 2014); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12).
NEC, R2-133641, Reply LS on security aspects of protocol architectures for small cell enhancements, 3GPP 'TSG RAN WG2 Meeting #83bis, Ljubljana, Slovenia, Oct. 7-11, 2013.
ZTE, RP-140720, New WID proposal: Dual connectivity enhancements, 3GPP TSG Meeting #64, Sophia Antipolis, France, Jun. 10-13, 2014.
Samsung, RP-140852, New Work Item Proposal on Dual Connectivity Enhancement for LTE, 3GPP TSG RAN Meeting #64, Sophia Antipolis, France, Jun. 10-13, 2014.
Samsung, RP-140951, Motivation for new WI Proposal on Dual Connectivity Enhancement for LTE, 3GPP TSG RAN #64, Sophia Antipolis, France, Jun. 10-13, 2014.
S2-140537, LS on system aspects for Small Cell Enhancement work in RAN, 3GPP TSG-SA WG2 Meeting #101, Taipei, Taiwan, Jan. 20-24, 2014.

\* cited by examiner

LOCAL BREAKOUT IN SMALL CELL ARCHITECTURE

TECHNICAL FIELD

The invention relates to communications.

BACKGROUND

In recent years, the phenomenal growth of mobile Internet services and proliferation of smart phones and tablets has increased a demand for mobile broadband services, and hence more data transmission capacity is required. One possibility to increase a data transmission rate of a user apparatus is dual connectivity. The basic principle of the dual connectivity is that the user apparatus may consume radio resources provided by at least two different network nodes, each network node controlling one or more cells, one of the network nodes being a master network node controlling radio resources for the user apparatus.

Some solutions to decrease the load of traffic from core networks of mobile systems to fixed networks include Local IP Access (LIPA) and Selected Internet IP Traffic Offload (SIPTO). In LIPA a user terminal connected to a femtocell may access devices of the local IP network that a femtocell is connected to via the femtocell base station. When a user has a femtocell at home or in the office, mobile devices may use LIPA to access devices that are connected to the local network over the femtocell. SIPTO, on the other hand, enables the user terminal to access Internet by-passing the core network by routing of some Internet Protocol (IP) traffic of the user terminal through a different route, for example via a local gateway.

BRIEF DESCRIPTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus, comprising: at least one processor and at least one memory including a computer program code, wherein the at least one memory and the computer program code are configured, with the at least one processor, to cause the apparatus to perform operations comprising: maintain a primary connection to a user terminal configured to operate using dual connectivity; maintain a first control interface to a first radio node maintaining a secondary connection to the user terminal configured to operate using dual connectivity, the first radio node providing a local gateway for the user terminal; maintain a second control interface to a core network and emulate a local gateway towards a core network by providing control plane functions of the local gateway provided by the first radio node towards the core network over the second control interface; and relay local gateway related control messages between the core network and the first radio node over the first control interface.

According to an aspect of the present invention, there is provided a radio node apparatus, comprising: at least one processor and at least one memory including a computer program code, wherein the at least one memory and the computer program code are configured, with the at least one processor, to cause the apparatus to perform operations comprising: maintain a secondary connection to a user terminal configured to operate using dual connectivity; provide a local gateway for the user terminal; maintain a first control interface to a second apparatus maintaining a primary connection to the user terminal configured to operate using dual connectivity, the second apparatus maintaining a second control interface to a core network and emulating a local gateway towards a core network by providing control plane functions of the local gateway provided by the first radio node towards the core network over the second control interface; and communicate local gateway related control messages with the core network over the first control interface.

According to an aspect of the present invention, there is provided a method, comprising: maintain a primary connection to a user terminal configured to operate using dual connectivity; maintain a first control interface to a first radio node maintaining a secondary connection to the user terminal configured to operate using dual connectivity, the first radio node providing a local gateway for the user terminal; maintain a second control interface to a core network and emulate a local gateway towards a core network by providing control plane functions of the local gateway provided by the first radio node towards the core network over the second control interface; and relay local gateway related control messages between the core network and the first radio node over the first control interface.

According to an aspect of the present invention, there is provided a method, comprising: maintain a secondary connection to a user terminal configured to operate using dual connectivity; provide a local gateway for the user terminal; maintain a first control interface to a second apparatus maintaining a primary connection to the user terminal configured to operate using dual connectivity, the second apparatus maintaining a second control interface to a core network and emulating a local gateway towards a core network by providing control plane functions of the local gateway provided by the first radio node towards the core network over the second control interface; and communicate local gateway related control messages with the core network over the first control interface.

BRIEF DESCRIPTION OF DRAWINGS

One or more examples of implementations are set forth in more detail in the accompanying drawings and the description below. Other features will be apparent from the description and drawings, and from the claims.

DETAILED DESCRIPTION OF SOME EMBODIMENTS

Embodiments of the present invention are applicable to any access network/system and apparatus that can be or are configured to support dual connectivity and local breakout or IP traffic offload. Examples of such access networks/systems include LTE (Long Term Evolution) access system, Worldwide Interoperability for Microwave Access (Wi-MAX), Wireless Local Area Network (WLAN), LTE Advanced (LTE-A), and beyond LTE-A, such as 4G (fourth generation) and 5G (fifth generation). The specifications of different systems and networks, especially in wireless communication, develop rapidly. Such development may require extra changes to embodiments. Therefore, all words and expressions should be interpreted broadly and they are intended to illustrate, not to restrict, the embodiments of the invention.

In the following, different embodiments will be described using, as an example of an access architecture to which the embodiments may be applied, a radio access architecture LTE-A.

Figure 1A:
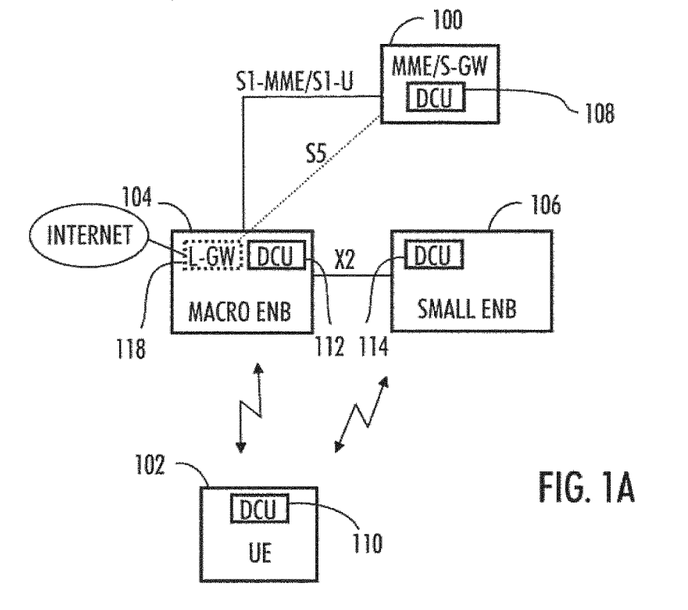
FIGS. 1A and 1B illustrate general architecture of exemplary systems.

A general architecture of an exemplary system is illustrated in FIG. 1A. FIG. 1A is a simplified system architecture only showing some elements and functional entities, all being logical units whose implementation may differ from what is shown. It is apparent to a person skilled in the art that the system may also comprise other functions and structures that are not illustrated, for example connections to the core network/system.

The exemplary system illustrated in FIG. 1A comprises user apparatuses 102 (only one illustrated in FIG. 1A) and two or more network nodes 104, 106 (only two illustrated in FIG. 1A) controlling one or more cells in a radio access system, and a mobility management entity/serving gateway 100.

The mobility management entity (MME) represents a mobility anchor entity in a core network that is involved in the bearer activation/deactivation processes, for example. The mobility management entity is configured to support dual connectivity and comprises for that purpose an control unit (DCU) 108. The control unit 108 is configured to recognize signaling relating to dual connectivity, and act upon it. The serving gateway (S-GW) routes and forwards user data packets further.

The user apparatus (user equipment, UE) 102 illustrates one type of an apparatus to which resources on the air interface are allocated and assigned, and thus any feature described herein with user apparatus (user equipment) may be implemented with a corresponding apparatus. The user apparatus 102 refers to a portable computing device that includes wireless mobile communication devices operating with or without a subscriber identification module (SIM), including, but not limited to, the following types of devices: mobile phone, smart-phone, personal digital assistant (PDA), handset, laptop computer, e-reading device, tablet. The user apparatus 102 may be configured to support also dual connectivity, and comprises for that purposes a dual connectivity (DCU) unit 110.

In the example of FIG. 1A, both network nodes 104, 106 depict an apparatus controlling one or more cells via which access is provided to the network the user apparatuses and the network nodes are connected to. In an LTE-A system, such a network node is an evolved node B (eNB). The evolved node B 104, or any corresponding network apparatus controlling one or more cells, is a computing device configured to control the radio resources, and connected to the evolved packet core network, thereby providing the user equipment 102 a connection to the communication system. Typically, but not necessarily, the evolved node B comprises all radio-related functionalities of the communication whereby the evolved node B, for example, schedules transmissions by assigning certain uplink resources for the user equipment and informing the user equipment about transmission formats to be used. The nodes 104, 106 may be configured to perform one or more of evolved node B functionalities described below with an embodiment, and to perform functionalities from different embodiments. For this purpose, the evolved node Bs comprises a dual connectivity decision unit (DCU) 112, 114 for dual connectivity.

The evolved node B also provides the cells but the exemplary embodiments may be implemented with a solution having a separate controlling apparatus, and separate cell providing apparatuses controlled by a controlling apparatus. Further, the cells may be macro cells, and/or small cells.

In dual connectivity, a user apparatus is connected to a master evolved node B (MeNB) controlling a primary cell and comprising a radio resource controlling unit for the user apparatus, and to a secondary evolved node B (SeNB) controlling a secondary cell. If the cell sizes are different, the evolved node B controlling the macro cell is typically selected to be the master evolved node B, since then fewer MeNB handovers are needed when the user apparatus moves compared to the situation in which the evolved node B controlling the small cell would have been selected to be MeNB. In the example of FIG. 1, node 104 illustrated as MeNB and node 106 as SeNB.

As FIG. 1A illustrates, it is known for an eNodeB such as MeNB 104 to support local IP breakout. The MeNB may comprise a local gateway L-GW 118 which may connect user terminals directly to Internet without routing the traffic via the core network (i.e S-GW 100). These services are based on using a L-GW as a breakout point that may be co-located in MeNB, or a stand-alone S-GW/L-GW placed near RAN-nodes.

An L-GW is actually an Evolved Packet Core (EPC) node i.e. a simplified Packet Gateway P-GW that is controlled via the MME and S-GW by using a S5 interface. From the UE perspective LIPA and SIPTO@LN operate by using a secondary Packet data Network (PDN) connection via an L-GW and the "primary" PDN connection for the default EPS bearer services user terminal is using simultaneously a P-GW located in the EPC.

Figure 1B:
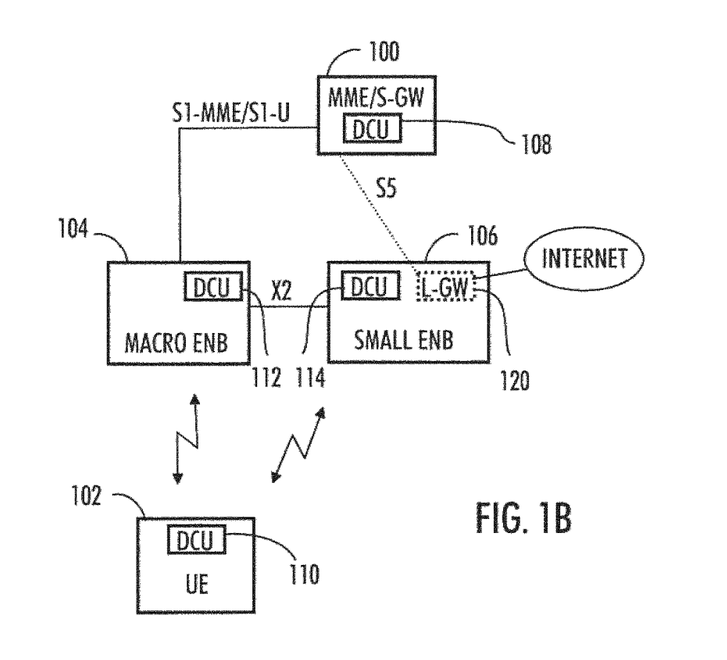

However, when dual connectivity is utilized, the SeNBs may be installed in the local networks such as corporate intranets, enterprise networks, campus networks etc. A local IP breakout may be considered as an add-on feature for SeNBs to provide a backhaul off-loading option, or to provide the users access to local networks directly via the Small Cell eNBs. On demand some user traffic can optionally be offloaded by SeNB directly without user plane traversing via the mobile operator's transport network at all. In this feature, added functionality is needed for local IP breakout bearer management. This requires specifying some additional functions in MeNBs, SeNBs and UEs. FIG. 1B illustrates an example, where SeNB 106 comprises a local gateway L-GW 120 which may connect UEs directly to Internet without routing the traffic via the core network (i.e S-GW 100) or the MeNB 104.

Placing L-GWs in the SeNBs in order to access local network directly from the SeNB/L-GWs presents some problems. One of the main issues is that a serving MeNB has one to one mapping with its co-located L-GW meaning that it can advertise only one L-GW to the EPC. This has the result that multitude of SeNB/L-GWs cannot be supported via a single S1-MME interface terminating in the serving MeNB.

Also each L-GW co-located with an SeNB would require termination of the S5 interface from the EPC resulting that numerous SeNB/L-GWs become exposed to the EPC even when there is a single S1-MME interface in the MeNB.

Another problem would be the mobility of the UE as the serving area of a SeNB is small and the user terminal movement out of it would mean SIPTO@LN service termination as every Inter SeNB handover would require also L-GW relocation. Actually this would be the same as a P-GW (or GGSN) relocation procedure that is not supported in 3GPP access. This is because a P-GW (or L-GW) is the default Router/IP Point of Attachment for a PDN-connection.

If a user terminal must change its P-GW then the only way is to release the current PDN connection and its associated bearers and after that to establish a new PDN connection/bearers via the target P-GW.

This is a real and unavoidable problem as the IP point of attachment/Router changes and the user terminal IP address must change accordingly and thus all the ongoing IP sessions/services using the old IP address will break.

In an embodiment, a solution is proposed for supporting the use of LIPA and SIPTO in local networks using a SeNB with dual connectivity capable user terminals where the Local IP Breakout point is located in a L-GW co-located at the SeNB).

The proposed solution is capable to hide numerous SeNB co-located L-GWs from the EPC and support Intra Local Area Network mobility within LIPA or SIPTO@LN service area (or a local zone) composed of multiple SeNBs with a co-located LGW providing access to the same local area network.

Figure 2:
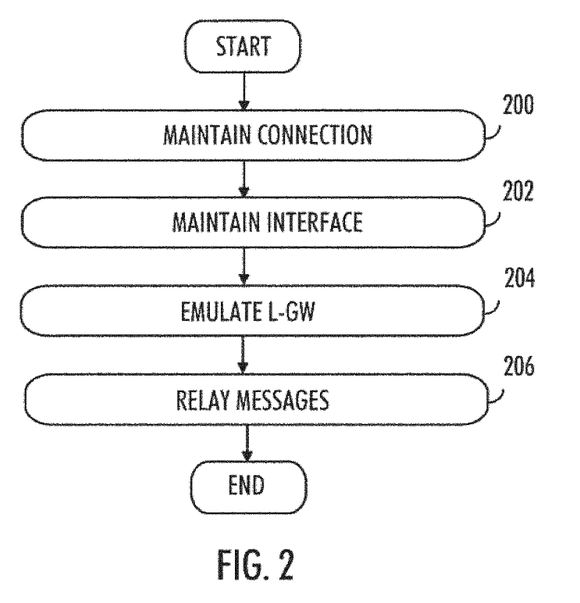
FIG. 2 is a flowchart illustrating an example of an embodiment.
Figure 3:
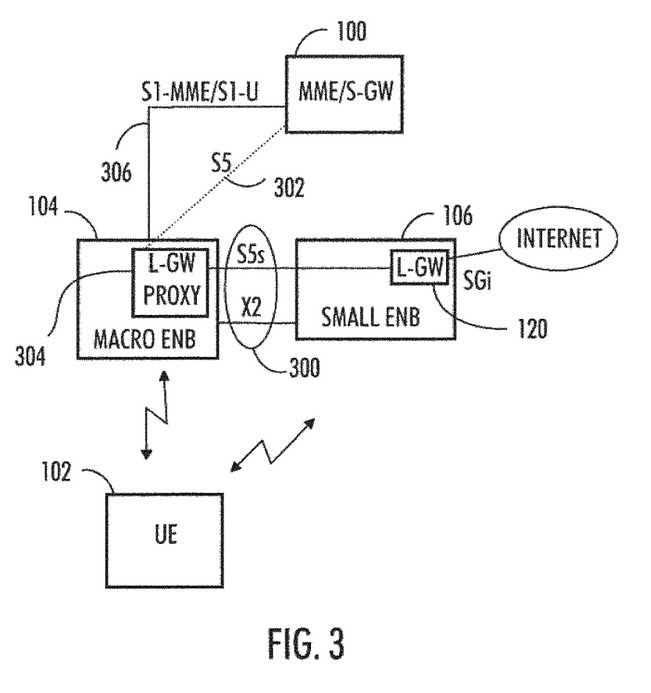
FIG. 3 illustrates an example of a system.

The flowchart of FIG. 2 and FIG. 3 illustrate an example of an embodiment. The example illustrates the operation of a MeNB 104 in connection with a dual connectivity user terminal 102.

In step 200, the MeNB 104 is configured to maintain a primary connection to a user terminal 102 configured to operate using dual connectivity. In an embodiment, the MeNB is configured to realize the dual connectivity management functions by implementing full radio stacks in both the MeNB 104 and in SeNBs 106 connected to it in order to enable LIPA or SIPTO@LN bearer service offloading via the SeNBs In step 202, the MeNB 104 is configured to maintain a first control interface 300 to a radio node, such as an SeNB 106, maintaining a secondary connection to the user terminal 110 configured to operate using dual connectivity and where there is a local gateway 120 co-located with the radio node. In an embodiment, the first interface may be called an extended X2 interface or S5s interface.

In step 204, the MeNB 104 is configured to maintain a second control interface 302 to a core network 100 and to emulate a local gateway 304 towards the core network by providing control plane functions of the local gateway 120 provided by the radio node 106 towards the core network over the second control interface 302. In an embodiment, the second interface 302 is S5 control interface. The S5 control interface 302 from the core network (typically from the S-GW serving the user terminal UE) that is used to control the L-GW for LIPA/SIPTO@LN service is terminated at the serving MeNB of the user terminal. Thus, it terminated at the same site as the S1-MME interface 306. It may be stated that in the control interface termination point the MeNB is configured to implement a co-located L-GW Proxy function 304 that emulates and hides the actual L-GWs 120 that are co-located in the SeNBs 106 connected to the MeNB 104.

In step 206, the MeNB is configured to relay local gateway related control messages between the core network 100 and the radio node 106 over the extended X2 or S5s control interface 300. The L-GW Proxy function 304 of the MeNB may relay the S5 control messages (such as General Packet Radio Service Tunnelling Protocol (GTP) messages in downlink) received from the S-GW to the L-GW co-locates at a SeNB over the control interface 300. Thus, the S5 interface is extended from the MeNB 104 to the L-GW 120 over the interface 300. The extended portion may be denoted as S5s interface. Correspondingly the L-GW Proxy function at the MeNB is configured to relay the S5 control message replies (GTP protocol messages in uplink) from the L-GW 120 located at SeNB 106 to the corer network (i.e. S-GW) 100.

The L-GW proxy function 304 of the MeNB 104 may be configured to manage the relaying of the extended S5 interface over the interface 300 by performing the required Internet Protocol address and General Packet Radio Service Tunnelling Protocol tunnel endpoint identifier value translations of the control messages transmitted between the core network and the first radio node.

Figure 4:
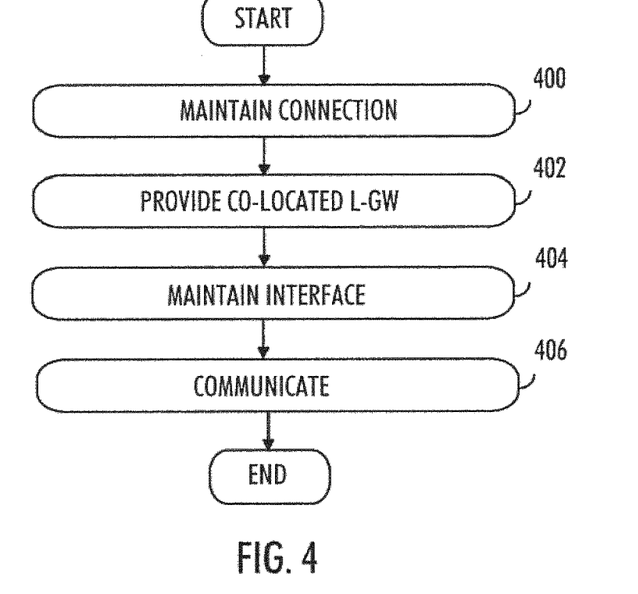
FIG. 4 is a flowchart illustrating an example of an embodiment.

The flowchart of FIG. 4 and FIG. 3 illustrate an example of an embodiment. The example illustrates the operation of a SeNB 106 in connection with a dual connectivity user terminal 102.

In step 400, the SeNB 106 is configured to maintain a secondary connection to a user terminal 110 configured to operate using dual connectivity.

In step 402, the SeNB 106 is configured to provide a local gateway 120 for the user terminal 110.

In step 404, the SeNB 106 is configured to maintain a control interface 300 to the radio node (typically MeNB 104) maintaining a primary connection to the user terminal 110. The radio node is configured to maintain a control interface 302 to the core network 100 and to emulate a local gateway 304 towards the core network by providing control plane functions of the local gateway 120 provided by the radio node 106 towards the core network over the control interface 302.

In step 406, the SeNB 106 is configured to communicate local gateway related control messages with the core network over the control interface 300 and via the emulated L-GW 304.

It may be noted that in the LIPA and SIPTO services utilising L-GW co-located in the SeNB the extended interface 300 does not implement the U-plane (user data) as the user data breaks out directly from the L-GW co-located in the SeNB to the local network or to the Internet. The extended interface 300 is configured to carry only control traffic.

As mentioned above, routing user bearer traffic (IP packets) directly out of a L-GW co-located at a SeNB requires a full radio stack in a SeNB including Packet Data Convergence Protocol (PDCP). Both the MeNB and the SeNB thus comprise PDCP, Radio Link Control (RLC) and Medium Access Control (MAC) layers.

As mentioned above, managing the LIPA or SIPTO@LN bearers that are offloaded via an L-GW co-located at a SeNB requires extensions to the known X2 interface, which extensions may be denoted as an S5s interface. For example, the bearer management signalling must indicate how a SeNB should route the offloaded bearer traffic e.g. to MeNB over X2-u, to S-GW with direct tunnel by-passing MeNB or to the co-located L-GW.

The SeNB 106 may be configured to report over the X2 interface the availability of its co-located L-GW 120 to the MeNB 104, transfer the IP address of the L-GW for S5s control interface and Local Network Identifier. The MeNB needs this information to be able to send it to its co-located L-GW proxy function when a SIPTO@LN bearer service utilising L-GW 120 is established.

The MeNB to 104 is configured to differentiate a SIPTO@LN bearer from the ordinary Enhanced Radio Access Bearers (E-RABs), which MME is controlling over the S1-MME interface and decide if offloading is to be done via a SeNB co-located L-GW.

When LIPA or SIPTO@LN service setup is initiated by the user terminal 110 or network while the terminal has dual connectivity via its serving MeNB 104 and a SeNB 106 having a co-located L-GW 120, the MeNB may be configured to advertise its co-located Proxy L-GW 304 to the MME and establish the extended S5s control interface over X2 interface to the actual L-GW 120 in the SeNB 106 so that the offloaded LIPA or SIPTO@LN bearer (Secondary Cell Group SCG bearer) becomes routed by the SeNB internally to its co-located L-GW and further to the local network via its local SGi interface.

As explained above, if a user terminal having a SIPTO@LN PDN connection using SeNB co-located L-GW is making a change from the SeNB to another SeNB while keeping the MeNB connection a L-GW relocation may be initiated which would necessitate a SIPTO@LN PDN connection release from the old (source) L-GW and a new PDN connection establishment via the new (target) L-GW as the user IP point of attachment (SGi) changes.

Figure 5A:
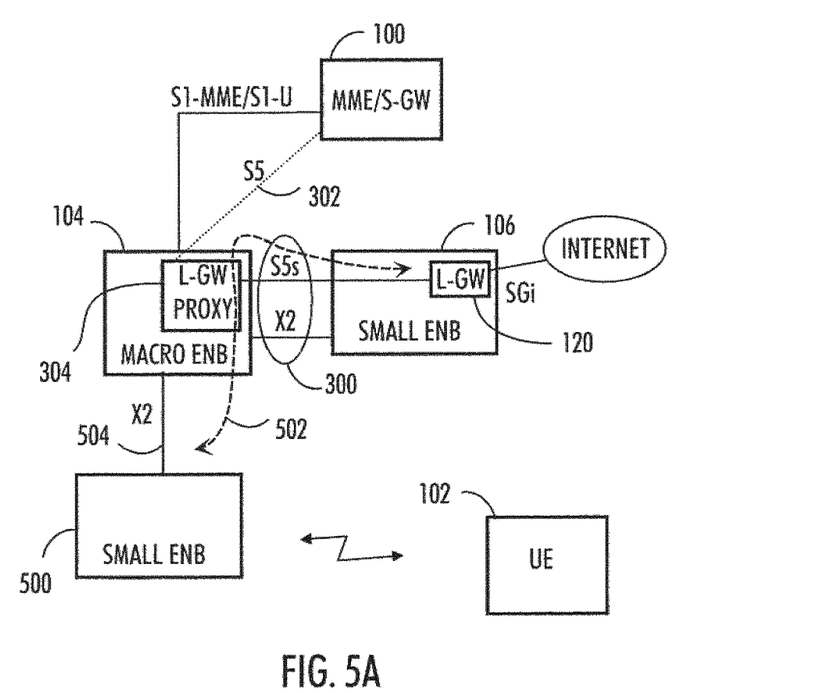
FIGS. 5A and 5B illustrate examples of systems.

FIG. 5A illustrates this embodiment. In this embodiment, to avoid L-GW relocation in the possible Inter SeNB handovers, or in the SeNB to MeNB handovers, the current SeNB co-located L-GW is kept as the U-plane anchor to preserve the LIPA or SIPTO@LN service. Likewise, the emulated L-GW functions on the C-plane remain anchored in the MeNB.

Thus in handovers from a SeNB 106 to another SeNB 500, the SCG bearer may be transferred to the target SeNB, but the current L-GW shall be kept as the U-plane anchor for LIPA or SIPTO@LN service with help of the GTP extension tunnels over the X2 interfaces on the U-Plane that traverse 502 from the target SeNB to the source SeNB co-located L-GW via the MeNB.

The first extension GTP-tunnel is run over the X2-u interface 504 from the SeNB 500 to the MeNB/L-GW-Proxy and its continuation GTP-tunnel from the MeNB/L-GW-Proxy to the L-GW is run over the X2-u interface 300.

The MeNB 104 and the L-GW proxy function 304 in the MeNB shall manage the relaying of the LIPA or SIPTO@LN bearer traffic (U-plane) over the X2 and S5s interfaces by performing the required TNL address (IP Address) and GTP TEID (Tunnel Endpoint Identifier) value translations.

Figure 5B:
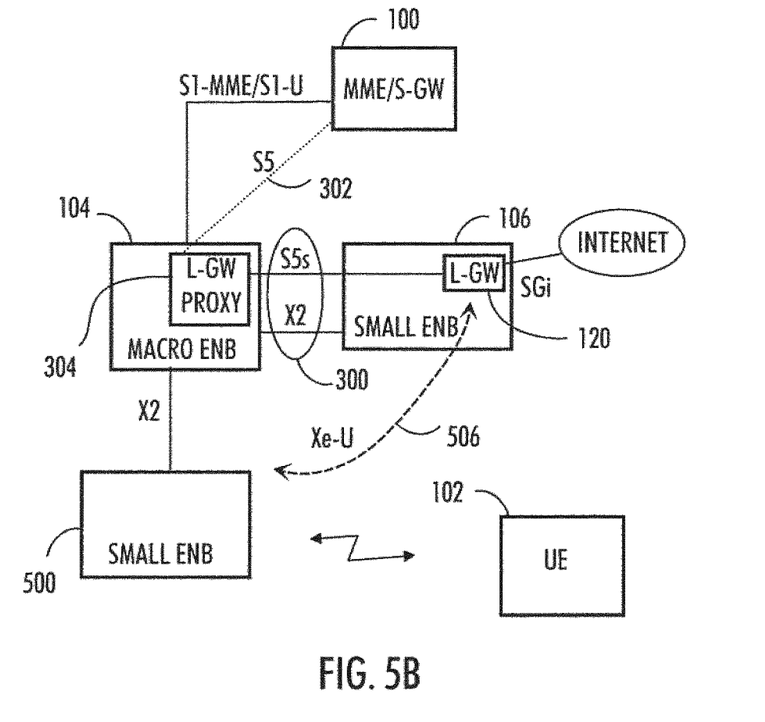

FIG. 5B illustrates this embodiment. In this embodiment, the extension tunnel 506 may be created directly between the target SeNB 500 and the initial SeNB/L-GW as shown in the following FIG. 5B.

Likewise, in handovers from a SeNB 106 to MeNB 104, the SCG bearer transfers to a MCG bearer via the MeNB, and the current L-GW 120 shall be kept as the U-plane anchor for LIPA or SIPTO@LN service with help of GTP extension tunnel over the X2 interface 300 on the U-Plane that traverse from the MeNB to the SeNB co-located L-GW 120.

Figure 6:
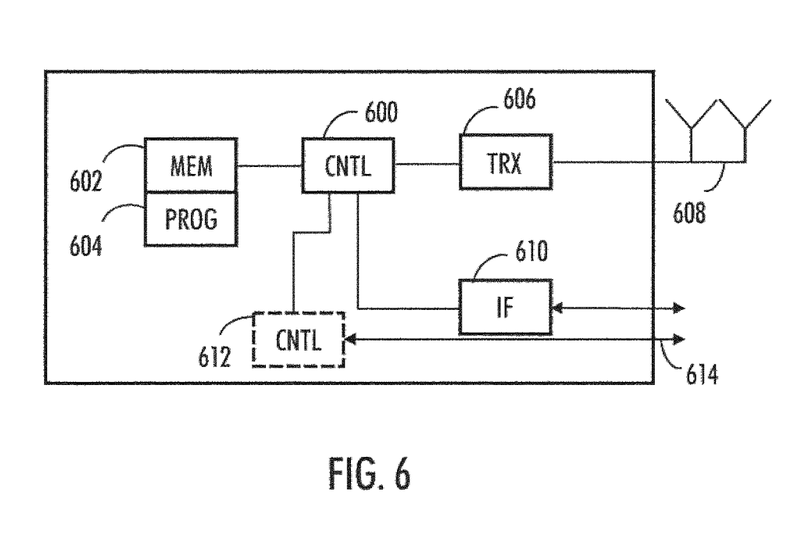
FIG. 6 illustrates a simplified example of an apparatus in which embodiments of the invention may be applied.

FIG. 6 illustrates an embodiment. The figure illustrates a simplified example of an apparatus in which embodiments of the invention may be applied. In some embodiments, the apparatus may be a base station or eNodeB or a part of an eNodeB. In some embodiments, the apparatus may be a MeNB and in some embodiments, the apparatus may be a SeNB with a co-located L-GW.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 600 configured to control at least part of the operation of the apparatus.

The apparatus may comprise a memory 602 for storing data. Furthermore the memory may store software 604 executable by the control circuitry 600. The memory may be integrated in the control circuitry.

The apparatus comprises a transceiver 606. The transceiver is operationally connected to the control circuitry 600. It may be connected to an antenna arrangement 608 comprising one more antenna elements or antennas.

The software 604 may comprise a computer program comprising program code means adapted to cause the control circuitry 600 of the apparatus to control the transceiver 606.

The control circuitry 600 is configured to execute one or more applications. The applications may be stored in the memory 602.

The apparatus may further comprise an interface 610 operationally connected to the control circuitry 600. The interface may connect the apparatus to other respective apparatuses such as eNodeBs via X2 interface.

If the apparatus is a MeNB, the interface may connect the apparatus to the core network via S1-MME/S1-U and/or S5 interface.

If the apparatus is a MeNB, the apparatus may further comprise controller 612 configured to emulate a local gateway towards core network by providing control plane functions of the local gateway located in another radio node. The controller may comprise memory and software (not shown for simplicity). The controller may be realized with separate hardware controller or it may be a part of controller 600.

In an embodiment if the apparatus is a MeNB, the applications executable by the control circuitry 600 may cause the apparatus to maintain a primary connection to a user terminal configured to operate using dual connectivity; maintain a first control interface to a first radio node maintaining a secondary connection to the user terminal configured to operate using dual connectivity, the first radio node providing a local gateway for the user terminal; maintain a second control interface to a core network and emulate a local gateway towards a core network by providing control plane functions of the local gateway provided by the first radio node towards the core network over the second control interface; and relay local gateway related control messages between the core network and the first radio node over the first control interface.

In an embodiment if the apparatus is a SeNB, the interface 610 may connect the apparatus to other respective apparatuses such as eNodeBs via X2 interface or S5s interface.

If the apparatus is a SeNB, the apparatus may further comprise controller 612 configured to provide a local gateway for a user terminal connected to the SeNB. The controller may comprise memory and software (not shown for simplicity). The controller 612 may comprise an interface to realize a connection 614 to Internet.

In an embodiment if the apparatus is a SeNB, the applications executable by the control circuitry 600 may cause the apparatus to maintain a secondary connection to a user terminal configured to operate using dual connectivity; provide a local gateway for the user terminal; maintain a first control interface to a second apparatus maintaining a primary connection to the user terminal configured to operate using dual connectivity, the second apparatus maintaining a second control interface to a core network and emulating a local gateway towards a core network by providing control plane functions of the local gateway provided by the first radio node towards the core network over the second control interface; and communicate local gateway related control messages with the core network over the first control interface.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, or a circuitry which may comprise a working memory (RAM), a central processing unit (CPU), and a system clock. The CPU may comprise a set of registers, an arithmetic logic unit, and a controller. The controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus, comprising:
at least one processor and at least one non-transitory memory including a computer program code, wherein the at least one memory and the computer program code are configured, with the at least one processor, to cause the apparatus to perform operations comprising:
maintain a primary connection by the apparatus to a user terminal configured to operate using dual connectivity;
maintain a first control interface by the apparatus to a first radio node maintaining a secondary connection to the user terminal configured to operate using dual connectivity, the first radio node providing a local gateway for the user terminal;
maintain a second control interface by the apparatus to a core network and emulate the local gateway towards the core network by implementing a co-located local gateway proxy function at the apparatus and by providing control plane functions of the local gateway provided by the first radio node towards the core network over the second control interface; and
relay control messages related to the local gateway between the core network and the first radio node over the first control interface.

2. The apparatus of claim 1, the at least one memory and the computer program code configured to, with the at least one processor, cause the apparatus further to:
perform address and identifier translations of the control messages relayed between the core network and the first radio node.

3. The apparatus of claim 2, wherein the apparatus is configured to perform Internet Protocol address and General Packet Radio Service Tunnelling Protocol tunnel endpoint identifier value translations of the control messages relayed between the core network and the first radio node.

4. The apparatus of claim 1, wherein the second control interface is S5, which is terminated at the apparatus.

5. The apparatus of claim 1, the at least one memory and the computer program code configured to, with the at least one processor, cause the apparatus further to control an establishment of a breakout using the local gateway maintained by the first radio node by provide information about the emulated local gateway to the core network, establish with the first radio node a control interface for relaying control messages between the core network and the first radio node.

6. The apparatus of claim 1, the at least one memory and the computer program code configured to, with the at least one processor, cause the apparatus further to determine that a second radio node is maintaining the secondary connection to the user terminal configured to operate using dual connectivity rather than the first radio node;

determine that the first radio node continues to provide the local gateway for the user terminal;

relay user data related to the local gateway between the first radio node and the second radio node.

7. The apparatus of claim 1, wherein the apparatus is an evolved NodeB of a communication system.

8. A radio node apparatus, comprising:

at least one processor and at least one non-transitory memory including a computer program code, wherein the at least one memory and the computer program code are configured, with the at least one processor, to cause the apparatus to perform operations comprising:

maintain a secondary connection by the apparatus to a user terminal configured to operate using dual connectivity;

provide a local gateway for the user terminal;

maintain a first control interface by the apparatus to a second apparatus maintaining a primary connection to the user terminal configured to operate using dual connectivity, the second apparatus maintaining a second control interface by the second apparatus to a core network and emulating the local gateway towards the core network by implementing a co-located local gateway proxy function at the second apparatus and by providing control plane functions of the local gateway provided by the first radio node towards the core network over the second control interface; and communicate control messages related to the local gateway with the core network over the first control interface.

9. The radio node apparatus of claim 8, the at least one memory and the computer program code configured to, with the at least one processor, cause the apparatus further to:

maintain the local gateway for the user terminal when the secondary connection of the user terminal is changed to another radio node;

communicate local gateway related user data with the another radio node.

10. The radio node apparatus of claim 9, wherein the local gateway related user data is communicated with the another radio node via the second apparatus maintaining the primary connection to the user terminal.

11. The radio node apparatus of claim 9, wherein radio node comprises an interface to the another radio node, and wherein the local gateway related user data is communicated with the another radio node via the interface.

12. A method performed by an electronic apparatus, comprising:

maintain a primary connection by the apparatus to a user terminal configured to operate using dual connectivity;

maintain a first control interface by the apparatus to a first radio node maintaining a secondary connection to the user terminal configured to operate using dual connectivity, the first radio node providing a local gateway for the user terminal;

maintain a second control interface by the apparatus to a core network and emulate the local gateway towards the core network by implementing a co-located local gateway proxy function at the apparatus and by providing control plane functions of the local gateway provided by the first radio node towards the core network over the second control interface; and relay control messages related to the local gateway between the core network and the first radio node over the first control interface.

13. The method of claim 12, further comprising:

perform address and identifier translations of the control messages relayed between the core network and the first radio node.

14. The method of claim 12, further comprising:

perform Internet Protocol address and General Packet Radio Service Tunnelling Protocol tunnel endpoint identifier value translations of the control messages relayed between the core network and the first radio node.

15. The method of claim 12, wherein the second control interface is S5, which is terminated at the apparatus.

16. The method of claim 12, further comprising:

control an establishment of a breakout using the local gateway maintained by the first radio node by provide information about the emulated local gateway to the core network, establish with the first radio node a control interface for relaying control messages between the core network and the first radio node.

17. The method of claim 12, further comprising:

determine that a second radio node is maintaining the secondary connection to the user terminal configured to operate using dual connectivity rather than the first radio node;

determine that the first radio node continues to provide the local gateway for the user terminal; and relay user data related to the local gateway between the first radio node and the second radio node.

18. A program product comprising a non-transitory computer readable medium comprising a computer program, comprising program instructions which, when loaded into the apparatus, are configured to control the apparatus to execute operations in the method of claim 12.

* * * * *

UNITED STATES PATENT AND TRADEMARK OFFICE
CERTIFICATE OF CORRECTION

PATENT NO. : 10,390,377 B2
APPLICATION NO. : 15/514569
DATED : August 20, 2019
INVENTOR(S) : Seppo Ilmari Vesterinen and Esa Mikael Malkamaki It is certified that error appears in the above-identified patent and that said Letters Patent is hereby corrected as shown below:

In the Claims

In Claim 5:
Column 11, Line 7, "relaying" should be deleted and --relaying local gateway related-- should be inserted.

In Claim 16:
Column 12, Line 42, "relaying" should be deleted and --relaying local gateway related-- should be inserted.

Signed and Sealed this
First Day of October, 2019

Andrei Iancu
*Director of the United States Patent and Trademark Office*